United States Patent Office 3,705,969
Patented Dec. 12, 1972

3,705,969
CUT-OFF PROTECTION SYSTEM FOR ELECTRICAL DISCHARGE MACHINING POWER SUPPLY
Oliver A. Bell, Jr., Mooresville, N.C., assignor to Colt Industries Operating Corp., Davidson, N.C.
Filed Nov. 8, 1971, Ser. No. 196,439
Int. Cl. B23p 1/08
U.S. Cl. 219—69 S        24 Claims

ABSTRACT OF THE DISCLOSURE

A short circuit protection system which includes a cut-off means operably connected to the output switch for interrupting or otherwise controlling its operation. A cut-off means receives its control signal as the result of a comparison of a gap voltage signal from one of the gap elements and a floating reference voltage signal derived from the other gap element with the cut-off means being activated responsive to a predetermined difference between these signals. The reference voltage network is thus connected directly to one of the gap elements and includes a Zener diode with associated potentiometer to allow adjusting of reference level. The reference voltage itself is keyed into operation in phase with the output switch conduction and thus in phase with each gap discharge.

REFERENCE TO RELATED APPLICATION

The present application is related to U.S. Ser. No. 122,936 filed on Mar. 10, 1971 on behalf of V. R. Verner and R. L. Syria for "Pulse Narrowing and Cut-Off Protection System for Electrical Discharge Machining." The aforementioned application is of common ownership with the present application.

BACKGROUND OF THE INVENTION

The field to which the present invention relates is known as electrical discharge machining, hereinafter sometimes referred to as EDM, in which material is removed from an electrically conductive workpiece by the action of electrical gap discharges passed between a tool electrode and a workpiece. An electrode or a workpiece servo feed system is used to provide relative movement to maintain an optimum gap spacing between the electrode and the workpiece as the workpiece material is continuously removed. A dielectric liquid coolant is circulated and recirculated normally under pressure through the gap during machining operation. For most reliable and predictable results, an EDM circuit of the independent pulse generator type is employed to provide machining power pulses of precisely controllable frequency and on-off time. In the independent pulse generator type of circuit, a pulser is normally embodied as an astable multivibrator, square wave oscillator or the like. During the electrical discharge machining operation, the gap may become bridged by workpiece or electrode particles, or by broken down components of the dielectric fluid itself, to cause a condition known as gap short circuit. This condition is normally accompanied by excessive localized heat which tends to damage either or both the electrode and the workpiece unless timely corrective action is taken. Various prior art systems have been devised to provide this corrective action either through fast acting servo withdrawal or through restrictive control over the current being passed to the gap. Current control may be exercised through control of the pulser itself, through increase of off-time or decrease of on-time, or in some cases through total interruption of the pulser and hence the interruption of the gap discharges until the short circuit condition can be alleviated.

A problem exists with respect to prior art cut-off circuits with regard to the reference voltage network which is used to provide a signal to which the gap voltage level may be compared. Most prior art electrical discharge machining cut-off circuits use a positive gap or arc ground in the machining power supply for a reference. In such circuits, there frequently occurred unwanted cut-off action because of intermediate noise and common node voltage which were generated in the work cable leads and elsewhere in the circuits.

SUMMARY OF THE PRESENT INVENTION

The present invention has the object of providing a cut-off system which reliably operates when gap voltage drops below a reference value, with the reference value being set up by a Zener diode, with the Zener diode being grounded to the positive gap element to provide a "floating" front end.

The present cut-off circuit employs a differential amplifier to provide a comparison between the gap voltage and the gap reference actually derived from the gap, rather than from the main machining power supply. In this manner, it has been found that the cut-off action is substantially improved and truly responds to gap voltage condition without being subject to noise existing in the power supply and in the connections going back through the power supply circuits to the main power source.

DESCRIPTION

Figure 1:
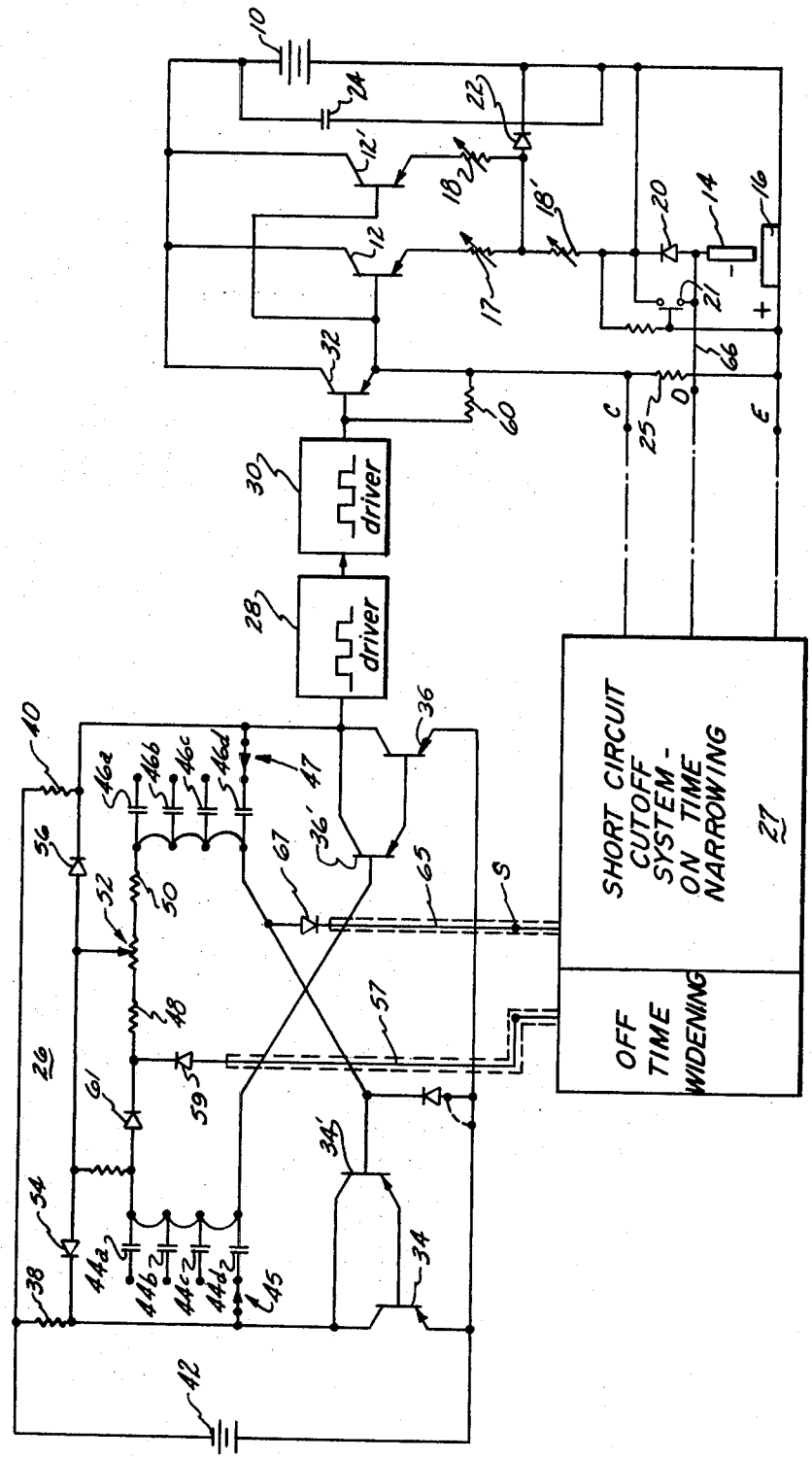
FIG. 1 is a combined schematic and block diagrammatic drawing of an electrical discharge machining power supply with a protection system according to the present invention shown in block diagram form.

Referring now to FIG. 1, the main machining power source 10 is shown connected in series with the power conducting or principal electrodes of a pair of parallel connected output stage transistors 12, 12' and in series with the machining gap which includes a tool electrode 14 and a workpiece 16. Gap current level is selectively controlled by the magnitude of series resistors 17, 18 and 18'. A rectifier 20 is included in circuit between the electrode 14 and the output stage transistors 12, 12' to permit high gap voltage operation without resultant damage to those transistors when contactor 21 is open. The network, including a diode 22, is also included to connect transistors 12, 12' to the positive terminal of the DC source 10 and to eliminate damaging high voltage spikes. A pulser capacitor 24 provides decoupling to eliminate voltage drops due to lead inductance from power source 10, or multivibrator stage 26 and several intermediate driver stages 28, 30 and 32 are used to turn the output stage transistors 12, 12' on and off with precisely controllable pulse duty factor. Resistor 25 provides a DC ground for transistor 32. In the interest of simplification, the driver stages 28 and 30 have been illustrated in block diagram form.

The multivibrator 26 includes transistor pairs 34, 34' and 36, 36'. These transistor pairs are biased and coupled for alternate switching operation in the astable multivibrator mode. The two respective transistor pairs are themselves compound connected in the Darlington configuration and operate as single electronic switching units to provide the necessary current amplification. The transistors 34 and 36 are each connected through a pair of load resistors 38 and 40 to the negative terminal of a DC source 42. A bank of cross-coupling capacitors 44a through 44d and 46a through 46d are connected to the multivibrator switches through the selective setting of switches 45 and 47, respectively. It will be seen that switches 45 and 47 function to cross-couple the collectors of the two transistors 34, 36, each to the opposing transistor pair base, to control the frequency of the machining power pulses provided to the machining gap. The switches 45 and 47 are normally connected for ganged operation. A pair of current limiting resistors 48 and 50 and a potentiometer 52 are included in the multivibrator circuit, with the machining pulse on-off time controlled by the setting of the movable contact of the potentiometer 52. A pair of blocking diodes 54, 56 are further connected in circuit with the movable contact of the potentiometer 52. Also included in the multivibrator 26 are a pair of control input networks which control the off-time of the multivibrator 26 through the transistor 34, or provide for reduction of the multivibrator 26 on-time through the transistor 36. The first such input network includes a lead 57 and diodes 59 and 61 coupled as shown. The second control input network includes a lead 65 and a diode 67 which provide an input to control the on-time of the multivibrator transistor 36. A shielded connection of the two input leads is utilized. The multivibrator control from the protection system will be discussed in more complete detail in connection with FIG. 2 hereinafter.

The pulse output indicated from the multivibrator 26 is suitably amplified and resquared through the several intermediate driver stages 28, 30 and 32 to render the output transistors 12, 12' alternately conductive and nonconductive and therefore to provide machining power pulses across the machining gap. Pulse on-time is controlled in phase with the conduction of the transistors 36, 36'. Pulse off-time is controlled in phase with the conduction of the transistors 34, 34'. It will be noted that while the present invention utilizes transistors as the electronic switches throughout the circuits, the invention is not so limited but, with proper redesign of the circuit by one skilled in the art, any electronic switch may be substituted. By "electronic switch" is meant any electronic control device having three or more electrodes comprising at least two power or principal electrodes acting to control current flow in the power circuit, the conductivity of the power circuit being regulated by a control electrode within the switch, whereby the conductivity of the power circuit is controlled statically or electrically without movement of any mechanical elements within the switch itself. Included within this definition are electron tubes, transistors, semiconductor controlled rectifiers, thyratrons and like devices.

Figure 2:
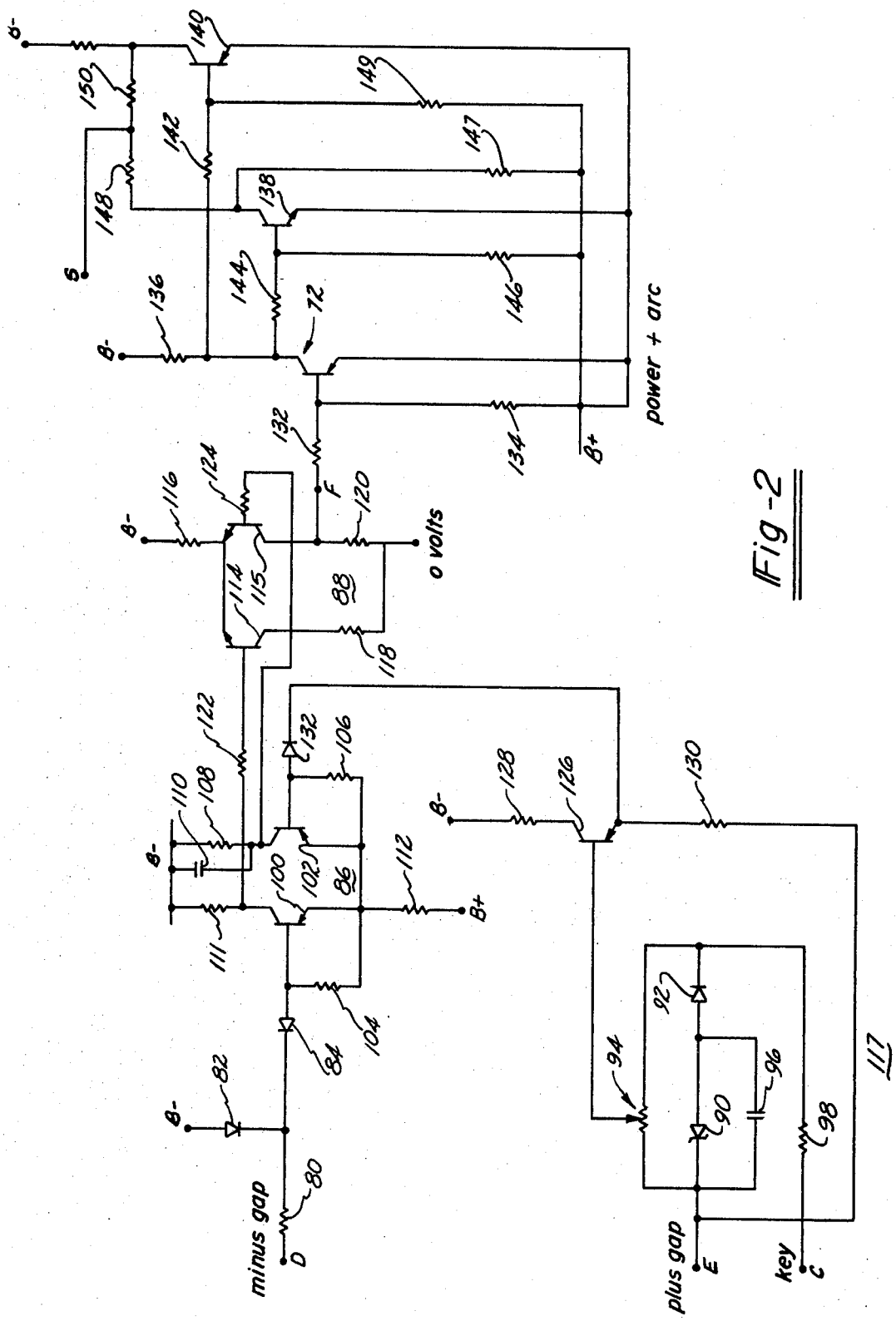
FIG. 2 is a detailed schematic drawing showing a portion of the cut-off protection system, namely that one which relates to the decrease of pulse on-time through control exercised over the multivibrator.

The circuit previously indicated in FIG. 1 in block 27 as "Short Circuit Cut-Off System" was divided into two portions related to Off-Time Widening and On-Time Narrowing. In FIG. 2 is shown that portion of the protection system which relates to the narrowing of the output pulse on-time during gap short circuit condition. The portion at the left-hand side related to Off-Time Widening is shown and described in detail in FIG. 2 of the aforementioned U.S. application Ser. No. 122,936, the appropriate parts of which are incorported herein by reference in the interest of brevity. Increased pulse off-time is achieved through the control of the conduction of the transistors 34, 34' of the multivibrator 26 through the lead 57. The protection system includes a cut-off electronic switch embodied as a transistor 72, which transistor is shown at the right-hand side of the drawing. The inputs include a pair of leads 66 and 68, terminals D and E of which are connected respectively to the tool electrode 14 and to the workpiece 16 with the negative and positive polarities indicated.

The other major elements in the short circuit protection system include a gap voltage sensing network with series resistor 80 and diodes 82 and 84. The diode 82 clamps the maximum voltage excursion to a level of the order of minus 70 volts. A pair of differential amplifiers 86 and 88 are connected in the manner shown to provide a control signal to a cut-off switch 72. The other input to the first differential amplifier 86 is that of a reference voltage signal, with the reference voltage network including a Zener diode 90 having an oppositely poled diode 92 in series with it and a potentiometer 94 connected across the two diodes for selectively adjusting the reference voltage level. The Zener diode 90 is shunted by a capacitor 96. It is important to note that the cathode of the Zener diode 90 is connected directly to the positive gap element at the junction point E. A keying input is provided from the emitter of the driver stage transistor 32 at junction point C and through a series resistor 98 to render the reference voltage effective in phase with the conduction of the output switches 12, 12' and accordingly in phase with each of the gap discharges and the pulses which are being passed across the gap.

Now with further reference to the two differential amplifiers included in the circuit, the first differential amplifier 86 includes a pair of PNP transistors 100 and 102. The respective base emitter junctions of the transistors 100, 102 are shunted by resistors 104 and 106 to protect them from excess turn-off voltages. A shunt RC network, including resistor 108 and capacitor 110, is connected in series between the collector of the transistor 102 and a suitable B minus voltage source. A load resistor 111 is connected in series with the collector of the transistor 100, while a second resistor 112 is connected in series between its emitter and a suitable positive voltage source.

The second differential amplifier, indicated by the numeral 88, includes a second pair of transistors 114 and 115, the emitters of which are connected to a suitable B minus source through a resistor 116. A pair of resistors 118 and 120 are connected between a zero voltage and the respective collectors of the transistors 114, 115. It will be seen that the respective collectors of the transistors 100 and 102 of the first differential amplifier 86 are connected through series resistors 122 and 124 respectively to the bases of the transistors 114, 115.

With reference to the reference voltage network 117 shown at the left-hand side of the FIG. 2 drawing, there is included between the reference voltage network and the differential amplifier 86 a common emitter stage including a transistor 126. The transistor 126 stage includes a pair of series resistors 128 and 130 connected between its collector and a B minus voltage source and between its emitter and the plus gap lead, respectively. The output from the transistor 126 is taken from its emitter and passed through signal diode 132 to the base of the transistor 102.

The remainder of the FIG. 2 drawing at the right-hand side shows the circuit by which a signal is generated responsive to operation of the cut-off switch 72 to provide a discrete output signal through terminal S, lead 65 and through the diode 67 as shown in FIG. 1, whereby the pulse on-time is narrowed. Concurrently with that effect, the current magnitude of the pulses being furnished to the gap is being substantially reduced.

Included in the circuit associated with the cut-off switch 72 is a signal resistor 132 connected in series with its base. A resistor 134 is connected between the base emitter junction of the transistor 72 to protect it from excess turn-off voltage spikes. A load resistor 136 is connected in series with the collector of the transistor 72 and a suitable negative voltage source. The output pulse to the terminal S is generated through the operation of a pair of transistors 138 and 140, which transistors are connected in a complementary configuration. It will be seen that there are provided two outputs from the collector of the transistor 72 through respective series resistors 142 and 144 to the bases of the transistors 140 and 138 to provide their change of state. Bias resistors 146, 147 and 149 are connected in circuit as shown. It will be seen that responsive to the switching of the transistors 138 and 140 the signal output will be taken from their collectors across a pair of resistors 148 and 150. This output signal is the one that will control the reduction of machining pulse on-time through the multivibrator 26.

DESCRIPTION OF OPERATION

During the normal operation of the machining power supply, the free running multivibrator 26 will furnish a continuous series of triggering pulses through the intermediate driver stages 28, 30 and 32 to turn the output transistors 12, 12' on and off, and thus provide machining power pulses across the gap. While normal machining operation continues, the servo feed associated with the apparatus (not shown) will continue to move the electrode 14 downwardly to maintain an optimum gap spacing between the electrode 14 and the workpiece 16. In the event the coolant flow becomes insufficient to keep the gap clear, or if large size particles become dislodged from the electrode and bridge the gap, the condition known as gap short circuiting may occur. At this point, the protection system according to the present invention becomes effective.

With reference to FIG. 2, a keying signal is applied at all times through the terminal C, with the signal being derived from the driver stage including transistor 32. The keying signal is a pulse which goes negative during each machining power pulse on-time. The diode 92 operates to clamp the voltage across potentiometer 94 to the Zener established voltage, which may be by way of example of the order of 21 volts. The resistor 98 pulls the voltage positive during the machining power pulse off-time to provide turn-off of the transistor 126. The reference voltage preset across the potentiometer 94 is applied to the base of the transistor 126. The signal output from the emitter of the transistor 126 is passed through the diode 132 to the base of the transistor 102 of the first differential amplifier 86. At the same time, there is applied to the base of the transistor 100 a signal which represents gap voltage, which signal in turn is taken from the terminal D of the lead 66.

In the present preferred embodiment, it will be seen that the electrode 14 is indicated as having a negative polarity and the workpiece 16 a positive polarity. This polarity may be selectively reversed in the event it becomes necessary to do so by reason of change of the workpiece and/or electrode material being used. If the gap voltage drops below the reference voltage, that is becomes more positive, then the transistor 100 will be turned off and the transistor 102 will be turned on. The outputs taken from the collectors of the two transistors in the differential amplifier 86 are used to control the change of state of the transistors 114, 115 of the following differential amplifier 88. It is noted that the second differential amplifier 88 serves to return the reference voltage for following circuitry back to the positive power arc ground, which is at the zero voltage level. In this manner, the short circuit protective system nulls out any noise which may be generated in the system and the machining power supply circuits between the positive gap element and the positive power arc.

It will be thus be seen that the present invention provides a substantially improved and a novel arrangement for a gap short circuit protection system, particularly in regard to the manner in which the reference voltage is set up and used to control machining current magnitude. While the particular pulser shown is a multivibrator, it will be understood that like arrangements may be used and similar controls may be exercised to either totally interrupt machining power to the pulse gap during the duration of the short circuit condition, or alternately to diminish the power of the pulses being furnished across the gap, or to increase their separation and in that manner decrease the magnitude of gap current to a safe level for the duration of the short circuit conditions.

What is claimed is:

1. In an electrical discharge machining apparatus for removing material from a conductive workpiece by electrical discharges passed between a tool electrode element and the workpiece element across a dielectric coolant filled gap, each of said elements of opposite polarity, a power source, an electronic output switch having its principal electrodes connected between said power source and the gap, a gap short circuit cut-off system comprising a pulser means of variable on-off time for periodically triggering said output switch into conduction to provide machining power pulses to said gap, said system including an electronic cut-off switch operatively connected to said pulser for controlling its operation in response to predetermined change in gap voltage, wherein the improvement comprises:

a differential amplifier having its output operably connected to said cut-off switch and including a pair of electronic switches, one of said switches having its control electrode connected to the negative polarity gap element for receiving a signal representative of gap voltage and the other of said switches having its control electrode connected to the positive polarity gap element through a reference voltage network for deriving a reference voltage signal therefrom, and a keying means including in circuit with said electronic output switch for providing to said reference voltage network a keying signal for rendering it effective in phase with each machining power pulse.

2. The combination as set forth in claim 1 wherein said reference voltage network includes a Zener diode connected in series with said positive gap element and a potentiometer operatively connected across said Zener diode for adjusting said reference voltage signal level.

3. The combination as set forth in claim 1 wherein a driver stage is connected between the output of said pulser means and said output switch for amplifying the pulses provided thereto and wherein said keying signal is derived from the output of said driver stage.

4. The combination as set forth in claim 1 wherein a second differential amplifier is serially connected between said first amplifier and said cut-off switch for returning said reference voltage to the zero voltage level.

5. The combination as set forth in claim 4 wherein the output from said cut-off switch is provided to a pair of electronic switches coupled in a complementary pair configuration, said complementary pair connected between the output of said cut-off switch and said pulser means for providing a control output signal to it for decreasing pulse on-time and hence reducing gap current.

6. The combination as set forth in claim 5 wherein the output from said complementary pair is also used to control said pulse off-time and wherein a means is included for generating from said cut-off switch output a second signal for extending the off-time of said pulser.

7. The combination as set forth in claim 1 wherein the control signal to said pulser is of sufficient magnitude to interrupt the operation of said pulser and thus totally interrupt current provided by said output switch to said machining gap.

8. In an electrical discharge machining apparatus for removing material from a conductive workpiece across a gap by electrical discharges passed between a tool electrode and the workpiece, one negative and the other positive, a power source, an electronic output switch having its principal electrodes connected between said power source and the gap, wherein the improvement comprises:
- a cut-off switch operably connected to and controlling the operation of said electronic output switch;
- a differential amplifier having its output operably connected to said cut-off switch and including a pair of electronic switches, one of said switches having its control electrode connected to said tool electrode, the other of said switches having its control electrode connected to said workpiece; and
- wherein said control electrode connected to said positive gap element has coupled to it a reference voltage network, said network including a Zener diode having its cathode connected to the positive gap element and a potentiometer operatively connected across said Zener diode for selectively adjusting the reference voltage level.

9. In an electrical discharge machining apparatus for removing material from a conductive workpiece by electrical discharges passed between tool electrode and workpiece elements across a dielectric filled gap, a power source, an electronic output switch having its principal electrodes connected between said power source and the gap for providing machining power pulses thereto, and a pulser means for operating said electronic output switch with predetermined on-off time, wherein the improvement comprises:
- a differential amplifier having its output operably connected to said output switch to restrict its output responsive to said condition, said differential amplifier including a pair of electronic switches, one of said switches having its control electrode connected to one of said gap elements for sensing gap voltage and the other of said switches having its control electrode connected to a reference voltage source, said reference voltage source derived from the other gap element; and
- a keying means connected to said reference voltage source for rendering the protective system operative in phase with gap discharges.

10. The combination as set forth in claim 9 wherein said differential amplifier includes connected to it a second differential amplifier for returning the reference voltage to zero voltage level.

11. The combination as set forth in claim 9 wherein the output of said second differential amplifier is operatively connected to and controls a complementary pair of electronic switches in their switching for providing a control pulse output to interrupt operation of said output switch.

12. The combination as set forth in claim 9 wherein a separate driver stage is connected intermediate said pulser and said electronic output switch and said keying means is connected to said driver stage to activate said reference in phase with the on-time of said output switch.

13. The combination as set forth in claim 9 wherein said pulser comprises a pair of electronic switches alternately conductive, one in phase with gap on-time and the other in phase with gap off-time, and wherein the output from said differential amplifier is operatively connected to said second mentioned switch for controlling its operation and increasing pulse off-time responsive to gap voltage below the reference voltage level.

14. The combination as set forth in claim 9 wherein said pulser comprises a pair of electronic switches alternately conductive, one in phase with gap on-time and the other in phase with gap off-time, and wherein the output of said differential amplified is operatively connected to said first mentioned switch for controlling its operation and decreasing pulse on-time responsive to gap voltage below said reference voltage level.

15. The combination as set forth in claim 9 wherein said pulser comprises a pair of electronic switches alternately conductive, one in phase with gap on-time and the other in phase with gap off-time, and wherein the output of said differential amplifier is operatively connected to both of the aforesaid on and off-time switches for decreasing the machining power pulse on-time and increasing the machining power pulse off-time.

16. In an electrical discharge machining apparatus for removing material from a conductive workpiece by electrical discharges passed between a tool electrode element and the workpiece element across a dielectric coolant filled gap, a power source, an electronic output switch having its principal electrodes connected between said power source and the gap, a gap short circuit protection system including:
- a cut-off means operably connected to said output switch for interrupting its operation;
- means for providing a gap voltage signal from one of said elements;
- means for deriving an opposite polarity reference voltage signal from the other of said elements; and
- means for activating said cut-off means responsive to a predetermined difference between said signals representative of gap short circuit condition.

17. The combination as set forth in claim 16 wherein said cut-off means includes a cut-off switch and a pair of electronic switches coupled in complementary pair configuration, said complementary pair connected between the output of said cut-off switch and the control electrode of said electronic output switch for interrupting electrical discharges for the duration of the short circuit condition.

18. The combination as set forth in claim 16 wherein said means for deriving the opposite polarity reference voltage signal includes a Zener diode connected in series with its respective gap element.

19. The combination as set forth in claim 18 wherein a differential amplifier is included in said cut-off means, said differential amplifier having a pair of electronic switches, one of said switches having its control electrode coupled to negative gap element, the other of said switches having its control electrode operatively connected to the positive gap element through said reference voltage network.

20. The combination as set forth in claim 19 wherein a second differential amplifier is connected intermediate said first differential amplifier and said cut-off means for returning the reference voltage to a zero voltage level.

21. The method of machining a conductive workpiece by electrical discharges passed between a tool electrode and a workpiece across a gap, including the steps of:
  (1) periodically triggering a power output switch connected to the gap into conduction for providing said discharges;
  (2) monitoring the gap voltage of each of said discharges across the gap;
  (3) deriving a floating reference voltage from one of the gap elements;
  (4) comparing the reference voltage to the gap voltage level at the other said gap elements; and
  (5) interrupting operation of said output switch responsive to a predetermined difference between the gap voltage and reference voltage.

22. The method of machining a conductive workpiece by electrical discharges passed between a tool electrode and a workpiece across a gap, including the steps of:
  (1) triggering a power output switch connected to the gap into conduction by triggering pulses of selectively variable on-off time;
  (2) sensing gap voltage at one of the gap elements;
  (3) deriving a reference voltage from the other of the gap elements;
  (4) comparing the two voltages; and (5) decreasing the triggering pulse on-time for said output switch responsive to a predetermined difference between the aforesaid voltages.

23. The combination as set forth in claim 22 including the step of increasing pulse off-time at the same time the pulse on-time is being decreased.

24. The method as set forth in claim 23 wherein a keying means in included intermediate the triggering input to the power output switch and the reference voltage deriving means for rendering the reference voltage effective in phase with gap on-time and the on-time of the power output switch.

References Cited

UNITED STATES PATENTS

| | | | |
|---|---|---|---|
| 3,539,755 | 11/1970 | Inoue | 219—69 P |
| 3,588,428 | 6/1971 | Sennowitz | 219—69 C X |
| 3,590,317 | 6/1971 | Sennowitz | 219—69 S X |
| 3,614,368 | 10/1971 | Lobur | 219—69 P |

RALPH F. STAUBLY, Primary Examiner

U.S. Cl. X.R.

219—69 C

ELI-147-A
E-111
PO-1050
(5/69)

UNITED STATES PATENT OFFICE
CERTIFICATE OF CORRECTION

Patent No. 3,705,969          Dated December 12, 1972

Inventor(s) OLIVER A. BELL, JR.

It is certified that error appears in the above-identified patent and that said Letters Patent are hereby corrected as shown below:

Column 1, line 31, following "122" delete hyphen "-", line 34, correct punctuation to read --Machining".-- ;

Column 7, line 72, change "amplified" to --amplifier-- ;

Column 8, line 41, preceding "negative" insert --the-- .

Signed and sealed this 15th day of May 1973.

(SEAL)
Attest:

EDWARD M. FLETCHER, JR.
Attesting Officer

ROBERT GOTTSCHALK
Commissioner of Patents